Patented Dec. 21, 1937

2,102,630

UNITED STATES PATENT OFFICE 2,102,630

CLOUDED VITREOUS ENAMEL

Ignaz Kreidl, Vienna, Austria

No Drawing. Application February 9, 1933, Serial No. 656,047

13 Claims. (Cl. 106—36.2)

This application is a substitution for and continuation in part of applicant's co-pending applications, Serial Nos. 270,152, filed April 14, 1928, and Serial No. 270,153, filed April 14, 1928, Serial No. 371,043, filed June 14, 1929, and Serial No. 656,048, filed February 9, 1933.

The art of producing clouded enamels in the enameling of iron ware or the like is well known and has been carried out, up to the present, in what is known as the wet enameling process in the following manner:

Firstly, an enamel frit composition is prepared by melting together the raw enamel mixture, i. e., a mixture of glass forming constituents, which frit, after cooling, is ground on a mill with water in the presence of clay, and a white clouding agent, such as are generally used for example tin oxide, zirconium oxide, antimony oxide or antimoniates; the quantity of the white clouding agent added amounting from about 6 to 8% of the weight of the enamel frit. The addition of clay, amounting usually from 5 to 6% of the weight of the enamel frit, serves to increase the viscosity of the mixture until it becomes pasty and, as such, can be applied in adhering relation on the article to be enameled in every desired thickness. The opaquing or clouding which may be caused by the clay itself is negligible or at least commercially insufficient due to the small opaquing effect of the clay which is borne out by the fact that in addition to the clay a white clouding agent always has to be added.

The ground frit, together with the water, the white clouding agent and the clay, constitutes the "slip" with which the wares to be enameled are coated, then dried at temperatures ranging from room temperature to 80° C., the drying being carried out for periods varying according to the temperature employed from a quarter of an hour to 12 hours, after which the enamel is burned or fired at a temperature of about 750–850° C. for periods varying according to the size of the article to be enameled from 2 to 5 minutes.

The clouding effect in these known processes is due to the fact that there exist in the enamel in a finely divided state solid substances with a refraction index much higher than that of glass, which substances in burning the enamel remain undissolved therein, thereby effecting a white coloring.

As enamel frit, in the known processes already formed glasses have been used; which were preclouded by adding raw substances containing fluorine to the raw glass mixture. But such additions to the frit of raw substances containing fluorine are not capable of functioning as substitutes for the addition of white clouding agents.

The present invention is based upon the discovery that enamel cloudings can be brought about without employing any of the conventional white insoluble clouding agents, by using, in lieu of some or all of the clouding oxides, substances which evolve gases and vapors in the enamel during the burning thereof, forming minute gas bubbles which are retained in and uniformly distributed throughout the fired enamel mass and cause refraction or diffraction of light transmitted therethrough.

For such cloudings, therefore, which are produced by gases or vapors, the main point is not, as formerly, to use so great a quantity of the clouding medium that the clouding effect is brought about entirely by the presence of an insoluble clouding agent itself, being finely distributed in the enamel, but on the contrary either in a substantial part or completely by the refraction or diffraction of light produced by bubbles formed by the gases evolved and retained by the enamel the actual quantities of such gases amounting to only fractions of the quantities of the substances which had formerly to be used for clouding. This will be readily understood, since for a gas clouding only the volume of the evolved and retained gas counts, the weight of which is very small. While in the known processes the solid clouding media have to be added to the enamel mass in quantities from 5 to 10% of the weight of the enamel batch,—the gas evolving substances are employed only in such quantities which leave in the enamel a certain gas volume necessary for clouding the weight of which gas amounts, for instance for $CO_2$, to only 0.05 to 0.06% of the weight of the enamel frit.

Therefore, even the color of the residue if any, of the gas clouding substance plays no part, and, hence, even colored and impure materials can be employed.

Now, according to one phase of the invention, the gas clouding is augmented by using the gas clouding means in conjunction with solid clouding agents, in case a raising of the gas clouding should be desired.

Thus, according to this feature of the invention, the resulting clouding in the enamel will be due only in part to the fine distribution of the white insoluble oxides in the enamel mass and in part to the presence of gas bubbles finely distributed throughout the enamel mass which gas bubbles act by refraction or diffraction of light. Thereby, a substantial portion of the expensive solid white clouding agents heretofore exclusively used can be saved without impairing the clouding effect in the least. This will be appreciated from the fact that while, according to conventional practice, the white insoluble clouding agents are added to the enamel batch or frit on the mill in quantities of from 6 to 8 per cent of the weight of the enamel frit, according to the present invention the quantity of these insoluble oxides can be reduced to fractions of their former amounts, and the deficiency in the clouding which would ordinarily thereby result is made up by the addition to the enamel batch of exceedingly small quantities of relatively inexpensive gas-evolving volatile or decomposable substances which may be either organic, inorganic or organic-inorganic compounds.

The employment of such mixtures or compounds of solid white clouding agents with substances which are solely effective by virtue of their gas-evolving property at the burning of the enamel, enables the white insoluble clouding agent to be favorably dosed, since for a given quantity of the insoluble clouding agent, the most favorable amount of the gas clouding agent to be added thereto, can be easily ascertained by trial, thereby rendering the clouding effect of the enamel quite easily controllable.

The present invention also possesses the advantage of enabling white clouding agents which have only insufficient covering power for use in preparing satisfactory cloudings, to be used in conjunction with gas-evolving means. In other words, the present invention renders it possible to use inferior qualities of tin oxide, zirconium oxide and the like, as white clouding agents, which hitherto could not be used for these purposes because of their poor physical properties, it being known that not all oxides of tin, zirconium and the like are satisfactory for effecting cloudings.

In carrying out the present invention the procedure to be followed is the same as is usual in the known processes for enameling iron ware hereinbefore set forth and differs therefrom only in that in lieu of a part or all of the known white insoluble oxides heretofore added to the enamel mass on the mill as clouding media, substances are added which per se are incapable of serving as clouding agents, but which, on burning of the enamel, evolve gases which provide the clouding.

The invention is applicable to enamel batches of well known composition now universally used, and all that is necessary to do is to add on the mill in lieu of the known white insoluble oxides heretofore used as clouding medium, a gas-evolving substance, and determine empirically the amount of said gas-evolving substances required for the best results.

Such gas cloudings can be produced both with materials which are completely volatile in the process of burning the enamel or which pass by decomposition completely into gaseous form, and also with materials which are only partly volatile during the burning process or which only partially pass by decomposition into gaseous form.

When substances are employed which are only partially volatile or which only partially pass into gaseous form during the process of burning the enamel, the characteristic of the invention of the present process is only brought about by that portion which is volatile and passes into gaseous form in the enamel upon the burning thereof and is retained in the enamel. Also such clouding media, therefore, which are only partially volatile or which only partially pass over into the gaseous form in the molten mass upon the burning of the enamel and which possess a large volatile portion, will function as clouding agents when used in quantities which are much less than the amount of clouding media hitherto usual, and, in fact, will function when used in fractions of these quantities.

That the volatile matter is responsible for the increase in clouding over that which could be secured by the frit used and clay alone, or over that secured by the frit used and clay with an insufficient proportion of insoluble oxide, is proven by the fact that if the gas evolving substance is omitted, the satisfactory increase in clouding is not secured.

It will thus be apparent that the present invention discloses an entirely new group of clouding media.

In the process according to the present invention also, even substances that are soluble in water can be employed as clouding media, provided they are volatile or comprise a volatile portion which will be liberated during the burning of the enamel.

An essential requirement in practicing the present invention is that, upon the burning of the enamel, only such quantities of gas are present or evolved that no seriously harmful escape of the bubbles of gas through the surface of the enamel coating after firing to smoothness can occur, and that the quantity of gas present or evolved and retained in the enamel is sufficiently great to bring about the cloudings by refraction or diffraction caused by the finely distributed gas bubbles in the enamel.

Accordingly, if in practicing the present invention it is found, upon the opaquing of the enamel, that an outwardly visible froth occurs, which would cause the surface of the enamel to become pierced, blistered and lustreless, the addition of the clouding medium must be diminished or the viscosity of the batch of enamel so varied that this phenomenon does not occur.

The viscosity can be diminished by adding the known fluxing agents such as fluor-spar, borax or the like, and it can be increased by adding clay, kaolin, quartz or the like.

I have further discovered that discolorations which may occur in the burning of the enamel, for example, by the deposition of carbon or by the decomposition of carbon compounds that fade or change color can be obviated by adding to the clouding medium or to the batch of the enamel on the mill oxidizing agents, such as saltpetre, chlorates and the like, which promote the decomposition of such carbon containing clouding medium.

I have further discovered that the formation of gas can also be brought about or promoted indirectly by the reaction of two or more substances, for instance, by a carbon compound with an oxidizing agent that causes or promotes its combustion during the burning of the enamel.

As clouding media there are available both the purely organic substances, compounds and complexes, and also the inorganic or inorganic-organic substances, compounds and complexes in which a non-volatile portion eventually present, no matter whether soluble in the enamel flux, or not, does not act as a known clouding agent. The availability of all these substances is, of course, based on the assumption that they can pass wholly or partly into gaseous form during the burning of the enamel.

To name only a few examples of organic clouding media which fall within the scope of the present invention there may be mentioned organic acids, both of the aliphatic and of the aromatic series, and their salts, alcohols, amides, carbohydrates and all substances which fulfill the aforementioned conditions. The number of these substances is so great that it would be superfluous to enumerate them. As specific examples of organic clouding media may be mentioned the fatty acids and their salts such as formic acid and its salts, acetic acid and its salts, oxalic acid and its salts, benzoic acid and its salts, naphthol, benzidine, starch, flour, and the like.

Examples of inorganic substances are salts of nitric acid, salts of nitrous acid, bicarbonates or mixtures of these substances. As specific examples may be mentioned the bicarbonates of alkali metals, nitrites of alkali or earth-alkali metals, nitrates etc.

The quantity of clouding medium requisite for the clouding admits of being ascertained empirically for each material without difficulty. It is dependent upon the volatile portion in the molten mass or the portion that passes into gaseous form during the process of burning the enamel. It is also dependent upon the permeability of the enamel batch with regard to the bubbles of gas formed therein.

The clouding is judged by comparing the clouding with a sample plate which has been clouded in the usual manner with tin oxide, usually about 6% tin oxide; the essential point always being whether the clouding is capable of replacing the customary clouding which is obtained with tin oxide.

*Examples*

(I) The following are examples of enamel mixtures to be fritted:

|     |                        | Grams |       |
|-----|------------------------|-------|-------|
| (1) | Borax                  | About | 19.0  |
|     | Felspar                | About | 35.5  |
|     | Quartz                 | About | 16.0  |
|     | Sodium silico-fluoride | About | 17.8  |
|     | Kaolin                 | About | 2.8   |
|     | Soda                   | About | 4.4   |
|     | Saltpetre              | About | 3.1   |
| (2) | Borax                  | About | 21.4  |
|     | Felspar                | About | 37.0  |
|     | Quartz                 | About | 11.4  |
|     | Sodium silico-fluoride | About | 17.8  |
|     | Kaolin                 | About | 5.7   |
|     | Soda                   | About | 4.3   |
|     | Sodium nitrate         | About | 2.1   |
| (3) | Borax                  | About | 24.6  |
|     | Felspar                | About | 24.6  |
|     | Quartz                 | About | 25.7  |
|     | Sodium silico-fluoride | About | 14.0  |
|     | Kaolin                 | About | 2.1   |
|     | Calc spar              | About | 1.6   |
|     | Soda                   | About | 3.2   |
|     | Sodium nitrate         | About | 4.2   |
| (4) | Borax                  | About | 22.0  |
|     | Felspar                | About | 30.4  |
|     | Fluorspar              | About | 1.6   |
|     | Soda                   | About | 8.3   |
|     | Quartz                 | About | 18.2  |
|     | Potassium nitrate      | About | 2.5   |
|     | Kaolin                 | About | 3.0   |
|     | Kryolithe              | About | 14.0  |
| (5) | Felspar                | About | 35.0  |
|     | Quartz                 | About | 5.7   |
|     | Sodium silico-fluoride | About | 12.6  |
|     | Soda                   | About | 6.8   |
|     | Potassium nitrate      | About | 5.0   |
|     | Borax                  | About | 20.6  |
|     | Kaolin                 | About | 12.6  |
|     | Magnesium oxide        | About | 0.7   |
| (6) | Borax                  | About | 88.0  |
|     | Soda                   | About | 30.0  |
|     | Kryolithe              | About | 36.0  |
|     | Fluorspar              | About | 16.0  |
|     | Potassium nitrate      | About | 8.0   |
|     | Quartz                 | About | 60.0  |
|     | Felspar                | About | 160.0 |

(II) Examples of clouding agents for the production of white clouded enamels from the above mentioned frits:

(a) 1000 grams of any one of the above mentioned frits are ground in the ordinary way with 400 to 450 grams of water, 0.2 gram benzidine as clouding agent and 60 grams clay, then applied to the objects to be enameled and dried thereon at temperatures of 60 to 100° C. and afterwards burned at about 800° C.

(b) 1000 grams of any one of the above mentioned frits are ground in the ordinary way with 400 to 450 grams of water, 0.2 gram β-naphthol as clouding agent and 60 grams clay, then applied to the objects to be enameled and further worked in the same manner as in Example (a).

(c) 1000 grams of any one of the above mentioned frits are ground in the ordinary way with 400 to 450 grams of water, 0.3 gram benzoic acid as clouding agent and 60 grams clay, then applied to the objects to be enameled and further worked in the same manner as in Example (a).

(d) 1000 grams of any one of the above mentioned frits are ground in the ordinary way with 400 to 450 grams of water, 14 grams formic acid as clouding agent and 60 grams of clay, then applied to the objects to be enameled and further worked in the same manner as in Example (a).

(e) 1000 grams of any one of the above mentioned frits are ground in the ordinary way with 400 to 450 grams of water, 12 grams crystalline oxalic acid as clouding agent and 60 grams clay, then applied to the objects to be enameled and further worked in the same manner as in Example (a).

(f) 1000 grams of any one of the above mentioned frits are ground in the ordinary way with 400 to 450 grams of water, 1 gram potassium nitrate as clouding agent and 100 grams clay, then applied to the objects to be enameled and further worked in the same manner as in Example (a).

(g) 1000 grams of any one of the above mentioned frits are ground in the ordinary way with 400 to 450 grams of water, 3 grams sodium acetate as clouding agent and 60 grams clay, then applied to the objects to be enameled and further worked in the same manner as in Example (a).

(h) 1000 grams of any one of the above mentioned frits are ground in the ordinary way with 400 to 450 grams of water, 2.5 grams butyric acid as clouding agent and 60 grams clay, then applied to the objects to be enameled and further worked in the same manner as in Example (a).

(i) 1000 grams of any one of the above mentioned frits are ground in the ordinary way with 400 to 450 grams of water, 2 grams of starch as clouding agent 0.5 gram saltpetre and 60 grams clay, then applied to the objects to be enameled and further worked in the same manner as in Example (a).

(k) 1000 grams of any one of the above mentioned frits are ground in the ordinary way with 400 to 450 grams of water, 0.2 gram benzidine as clouding agent, 0.5 gram saltpetre and 60 grams clay, then applied to the objects to be enameled and further worked in the same manner as in Example (a).

In Examples (i) and (k) the clouding agent (starch and benzidine) is employed together with an oxidizing agent (saltpetre) which promotes the decomposition of the clouding agent during burning the enamel.

(l) 1000 grams of any one of the above mentioned frits are ground in the ordinary way with 400 to 450 grams of water, 20 grams tin oxide and 20 grams ammonium oxalate as clouding agent and 60 grams clay, then applied to the objects to be enameled and dried thereon at temperatures of 60 to 100° C. and afterwards burned at about 800° C.

(m) 1000 grams of any one of the above mentioned frits are ground in the ordinary way with 400 to 450 grams of water, 15 grams zirconium oxide and 0.2 gram β-naphthol as clouding agent and 60 grams clay, then applied to the objects to be enameled and further worked in the same manner as in Example (a).

(n) 1000 grams of any one of the above mentioned frits are ground in the ordinary way with 400 to 450 grams of water, 20 grams zirconium oxide and 0.3 gram benzoic acid as clouding agent and 60 grams clay, then applied to the objects to be enameled and further worked in the same manner as in Example (a).

(o) 1000 grams of any one of the above mentioned frits are ground in the ordinary way with 400 to 450 grams of water, 10 grams zirconium oxide and 0.2 gram benzidine as clouding agent and 60 grams of clay, then applied to the objects to be enameled and further worked in the same manner as in Example (a).

What I claim is:

1. An article of manufacture comprising a metal article having thereon a coating of clouded vitreous enamel produced from a slip containing clay and having an opacity substantially greater than that which would be produced with the frit used and clay alone, a substantial part of the increase in opacity over that caused by the frit and clay alone being contributed by gas bubbles which are retained in the fired enamel.

2. An article of manufacture comprising a metal article having thereon a coating of clouded vitreous enamel produced from a slip containing clay and having an opacity substantially greater than that which would be produced with the frit used and clay alone, a major part of the increase in opacity over that caused by the frit and clay alone being contributed by gas bubbles which are retained in the fired enamel.

3. An article of manufacture comprising a metal article having thereon a coating of clouded vitreous enamel produced from a slip, containing clay and opaquing metal oxide and having an opacity substantially greater than that which would be produced with the frit used, the oxide and clay alone, the increase in opacity over that caused by the frit, oxide and clay alone being contributed by gas bubbles which are retained in the fired enamel.

4. An article of manufacture comprising a metal article having thereon a coating of clouded vitreous enamel produced from a slip containing clay and having an opacity substantially greater than that which would be produced with the frit used and clay alone, substantially all of the increase in opacity over that caused by the frit and clay alone being contributed by gas bubbles which are retained in the fired enamel.

5. In a method of producing a metallic article having thereon a coating of clouded vitreous enamel having an opacity substantially greater than that which could be produced with the frit used and clay alone, and in which a substantial part of the increased opacity is contributed by gas bubbles retained in the enamel, the step which comprises incorporating in the enamel slip containing clay a gas-evolving agent which, upon the firing of the enamel, evolves gases which are retained in the enamel at the firing temperature thereof in the form of bubbles of such sizes and number as to contribute a substantial increase to the opacity.

6. In a method of producing a metallic article having thereon a coating of clouded vitreous enamel having an opacity substantially greater than that which could be produced with the frit used and clay alone, and in which a major part of the increased opacity is contributed by gas bubbles retained in the enamel, the step which comprises incorporating in the enamel slip containing clay a gas-evolving agent which, upon the firing of the enamel, evolves gases which are retained in the enamel at the firing temperature thereof in the form of bubbles of such sizes and number as to contribute a substantial increase to the opacity.

7. In a method of producing a metallic article having thereon a coating of clouded vitreous enamel having an opacity substantially greater than that which could be produced with the frit used and clay alone, and in which substantially all of the increased opacity is contributed by gas bubbles retained in the enamel, the step which comprises incorporating in the enamel slip containing clay a gas-evolving agent which, upon the firing of the enamel, evolves gases which are retained in the enamel at the firing temperature thereof in the form of bubbles of such sizes and number as to contribute a substantial increase to the opacity.

8. The method of producing a metal article having thereon a coating of clouded vitreous enamel having an opacity substantially greater than that which could be produced with the frit used and clay alone, and in which a substantial part of the increased opacity is contributed by gas bubbles retained in the enamel, which comprises applying to the article a slip comprising an enamel frit, clay and a gas-evolving agent which, upon the firing of the enamel, evolves gases which are retained in the enamel at the firing temperature thereof in the form of bubbles of such sizes and number as to contribute a substantial increase to the opacity, and firing the slip on the article.

9. A method according to claim 5, in which the gas evolving agent comprises an organic compound.

10. A method according to claim 5, in which there is incorporated in the slip a substance which causes or promotes the decomposition of the gas-evolving agent into gas.

11. A method according to claim 5, in which there is incorporated in the slip an oxidizing agent.

12. A method according to claim 5, in which there is incorporated in the slip an oxidizing agent selected from the group consisting of nitrates and chlorates.

13. An enamel slip for clouded enamels for metal ware to produce thereon a coating of clouded vitreous enamel having an opacity substantially greater than that which could be produced with the frit used and clay alone, and in which a substantial part of the increased opacity is contributed by gas bubbles retained in the enamel, comprising a ground mixture of enamel frit, clay, water and a gas-evolving agent which, upon the firing of the enamel, evolves gases which are retained in the enamel at the firing temperature thereof in the form of bubbles of such sizes and number as to contribute a substantial increase to the opacity.

IGNAZ KREIDL.